United States Patent
Shauck et al.

(10) Patent No.: US 9,652,571 B2
(45) Date of Patent: May 16, 2017

(54) RECIPROCAL QUANTUM LOGIC (RQL) CIRCUIT SYNTHESIS

(71) Applicants: Steven B. Shauck, Crofton, MD (US); Gary L. Phifer, Harleysville, PA (US)

(72) Inventors: Steven B. Shauck, Crofton, MD (US); Gary L. Phifer, Harleysville, PA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 16 days.

(21) Appl. No.: 14/526,904

(22) Filed: Oct. 29, 2014

(65) Prior Publication Data

US 2016/0125102 A1  May 5, 2016

(51) Int. Cl.
*G06F 17/50* (2006.01)
*H03K 3/38* (2006.01)
*G06N 99/00* (2010.01)

(52) U.S. Cl.
CPC ........ *G06F 17/505* (2013.01); *G06F 17/5081* (2013.01); *G06F 17/5072* (2013.01); *G06F 17/5077* (2013.01); *G06N 99/002* (2013.01); *H03K 3/38* (2013.01)

(58) Field of Classification Search
CPC ............... G06F 17/505; G06F 17/5072; G06F 17/5077; G01N 99/02
USPC ....... 716/104, 103, 119, 112, 123, 129, 130; 703/16
See application file for complete search history.

(56) References Cited

U.S. PATENT DOCUMENTS

| | | | |
|---|---|---|---|
| 5,752,069 A * | 5/1998 | Roberts | G06F 9/3004 711/128 |
| 5,942,997 A * | 8/1999 | Silver | H03M 1/121 341/133 |
| 7,694,242 B1 | 4/2010 | Li et al. | |
| 8,260,144 B2 * | 9/2012 | Gupta | H04L 27/2096 398/115 |
| 9,292,642 B2 * | 3/2016 | Herr | G06F 17/505 |

(Continued)

OTHER PUBLICATIONS

Oberg et al., "Integrated Power Divider for Superconducting Digital Circuits", IEEE Transactions on Applied Superconductivity, vol. 21, No. 3, Jun. 2011, pp. 571-574.*

(Continued)

*Primary Examiner* — Phallaka Kik
(74) *Attorney, Agent, or Firm* — Tarolli, Sundheim, Covell & Tummino LLP (57) ABSTRACT

One embodiment of the invention includes a method for generating a Reciprocal Quantum Logic (RQL) circuit design via a synthesis tool. The method includes providing data associated with behavior and constraints of the RQL circuit design and a component library to the synthesis tool. The method also includes generating an RQL netlist circuit comprising a flip-flop device placeholder and a circuit system coupled to at least one of an input and an output of the flip-flop device placeholder via the synthesis tool based on the data and a component library. The method also includes separating the circuit system into circuit subsystems that are each associated with a separate respective phase of a clock signal via the synthesis tool based on inputs. The method further includes removing the flip-flop device placeholder from the RQL netlist circuit via the synthesis tool to generate the RQL circuit design from the RQL netlist circuit.

20 Claims, 6 Drawing Sheets

(56) References Cited

U.S. PATENT DOCUMENTS

| | | | |
|---|---|---|---|
| 2005/0023518 A1* | 2/2005 | Herr | G06F 5/08 |
| | | | 257/13 |
| 2008/0049885 A1* | 2/2008 | Inamdar | H03K 5/13 |
| | | | 375/376 |
| 2013/0040818 A1 | 2/2013 | Herr et al. | |
| 2016/0034609 A1* | 2/2016 | Herr | G06F 17/505 |
| | | | 716/104 |

OTHER PUBLICATIONS

International Search Report from corresponding PCT/US2014/062895 mailed Jul. 8, 2015.

Herr, et al.: "*Ultra-Low-Power Superconductor Logic*"; Journal of Applied Physics, American Institute of Physics, US, vol. 109, No. 10, May 17, 2011 (May 17, 2011), pp. 103903-103903, XP012146891, ISSN: 0021-8979, 001: 10.1063/1.3585849 the whole document.

Mukhanov: "*Energy-Efficient Single Flux Quantum Technology*"; IEEE Transactions on Applied Superconductivity, IEEE Service Center, Los Alamitos, CA, US, vol. 21, No. 3, Jun. 1, 2011 (Jun. 1, 2011), pp. 760-769, XP011324834, ISSN: 1051-8223, DOI: 10.1109/TASC.2010.2096792 p. 762, col. 2.

\* cited by examiner

RECIPROCAL QUANTUM LOGIC (RQL) CIRCUIT SYNTHESIS

TECHNICAL FIELD

This disclosure relates generally to quantum and classical circuit systems, and specifically to Reciprocal Quantum Logic (RQL) circuit synthesis.

BACKGROUND

Circuit synthesis is a software-implemented tool for designing circuits based on providing inputs corresponding to circuit components, desired behavior, and constraints in an interactive or batch manner. Circuit synthesis can typically be implemented for complementary metal-oxide semiconductor (CMOS) circuit design, based on behavioral Register Transfer Level (RTL) code which is typically written in VHSIC Hardware Description Language (VHDL), Verilog, or System C. As applications for superconducting circuit systems become more prevalent, using circuit synthesis can be a manner to more quickly and efficiently optimize a superconducting circuit design, including Reciprocal Quantum Logic (RQL) circuits. In CMOS circuits, the component building blocks are classified as combinatorial (i.e., the output depends only on current inputs), such as an AND gate, or sequential (i.e., the output depends on current and previous inputs), such as a flip-flop (also known as a FF or register) or a level-sensitive latch. Sequential devices have the property of memory or storing a state. In RQL, these strict combinatorial and sequential classifications do not apply because a Josephson transmission line (JTL) is technically sequential, but it is frequently used more like a buffer where it is combinatorial. The FF is edge-sensitive to the clock and is the corner stone of a synchronous design methodology supported by synthesis.

Some circuit devices that are typically required in a CMOS synthesis system, such as an edge-triggered flip-flop device, cannot be efficiently built in RQL. Most current commercial CMOS synthesizers require the component library to contain a sequential FF element. The role of the synthesizer is to take behavioral RTL code and translate it into a netlist comprised of cells in the component library for some fabrication process. Additional separate tools, while not part of the synthesis process, can be used in the overall flow. A separate tool know as a simulator can typically be used to verify functional correctness of the RTL code before it is synthesized. After synthesis, other tools can be used to implement the steps of placement and routing. During place and route, netlist changes may be introduced either automatically by tools or with manual edits, for any of a variety of purposes (e.g., satisfying timing requirements using a static timing analysis tool). The simulator can be run again on the final gate-level netlist produced after place-and-route or logical equivalency checking between gate-level netlist and RTL code as a final verification step. Other physical verification steps like layout-versus-schematic (LVS), a design rule check (DRC), electrical rule check (ERC), and design for manufacturing (DFM) checks can also be used before a design is actually fabricated.

SUMMARY

One embodiment of the invention includes a method for generating a Reciprocal Quantum Logic (RQL) circuit design via a synthesis tool. The method includes providing data associated with behavior and constraints of the RQL circuit design and a component library to the synthesis tool. The method also includes generating an RQL netlist circuit comprising a flip-flop device placeholder and a circuit system coupled to at least one of an input and an output of the flip-flop device placeholder via the synthesis tool based on the data. The method also includes separating the circuit system into a plurality of circuit subsystems that are each associated with a separate respective phase of a clock signal via the synthesis tool based on inputs. The method further includes removing the flip-flop device placeholder from the RQL netlist circuit via the synthesis tool based on the inputs to generate the RQL circuit design from the RQL netlist circuit.

Another embodiment of the invention includes a method for generating an RQL circuit design via a synthesis tool. The method includes providing data associated with behavior and constraints of the RQL circuit design and a component library to the synthesis tool. The method also includes generating an RQL netlist circuit comprising a flip-flop device placeholder and a circuit system coupled to at least one of an input and an output of the flip-flop device placeholder via the synthesis tool based on the data. The method also includes replacing the flip-flop device placeholder with a plurality of sequential flip-flop devices controlled by a separate clock signal corresponding respectively to each separate phase of the clock signal based on inputs. The method also includes separating the circuit system into a plurality of circuit subsystems that are each associated with a separate one of the plurality of sequential flip-flop devices, such that each of the plurality of sequential flip-flops interconnect a respective pair of the plurality of circuit subsystems based on the inputs. The method further includes removing each of the plurality of sequential flip-flop devices from the RQL netlist circuit via the synthesis tool based on the inputs to generate the RQL circuit design based on the RQL netlist circuit.

Another embodiment of the invention includes a method for generating an RQL circuit design via a synthesis tool. The method includes providing data associated with behavior and constraints of the RQL circuit design and a component library to the synthesis tool. The method also includes generating an RQL netlist circuit comprising a flip-flop device placeholder and a circuit system coupled to at least one of an input and an output of the flip-flop device placeholder via the synthesis tool based on the data. The method also includes performing a register rebalance operation on the RQL netlist circuit via the synthesis tool to separate the circuit system into a first circuit subsystem, a second circuit subsystem, a third circuit subsystem, and a fourth circuit subsystem that are each associated with a separate respective phase of a quadrature clock signal. The method further includes removing the flip-flop device placeholder from the RQL netlist circuit via the synthesis tool based on inputs to generate the RQL circuit design based on the RQL netlist circuit.

DETAILED DESCRIPTION

This disclosure relates generally to quantum and classical circuit systems, and specifically to Reciprocal Quantum Logic (RQL) circuit synthesis. A circuit synthesis system can include a synthesis tool (e.g., one which is typically configured for complementary metal-oxide semiconductor (CMOS) circuit design) that can be implemented to generate an RQL netlist circuit that can be functionally simulated, such as corresponding to a desired RQL circuit design. A component library can be uploaded to the synthesis tool, such as can be implemented to allow a user to generate the RQL netlist circuit from behavioral and constraint data associated with the desired RQL circuit design. The generated RQL netlist circuit can include at least one flip-flop device placeholder and a circuit system that is coupled to at least one of an input and an output of the flip-flop device placeholder. Via inputs provided to the synthesis tool, the user can replace each of the flip-flop device placeholders with a plurality of flip-flop devices (e.g., four flip-flop devices) that are sequentially coupled and which are controlled by separate clock signals that are each out-of-phase with respect to each other (e.g., 90° out-of-phase). The user can then separate the circuit system into a plurality of circuit subsystems that are each associated with multiple flip-flop devices, such that each of the flip-flop devices interconnect a pair of the circuit subsystems. As an example, the separation of the circuit system into the circuit subsystems can be based on performing a register rebalancing operation via the synthesis tool.

The user can then remove the flip-flop devices via inputs to provide coupling between the circuit subsystems interconnected by the flip-flop devices. The clock signal(s) can be provided to the circuit subsystems in a manner to provide sequential triggering of the circuit subsystems based on respective phases of the clock signal(s). As an example, the clock signal(s) can include a pair of quadrature clock signals, such that the quadrature clock signals can be provided to sequentially trigger four circuit subsystems. In addition, subsequent to the removal of the flip-flop devices, the phase information of each of the circuit subsystems can be analyzed with respect to each other to ensure sequential coupling of the circuit subsystems with respect to the phases of the clock signal. Thus, in response to sequentially coupled circuit subsystems not having sequential clock signal phases, the user can add Josephson transmission lines (JTLs) to interconnect the sequentially coupled circuit subsystems. For example, a number of JTLs can be added for each phase segment difference greater than one. Therefore, the sequentially coupled circuit subsystems can be sequentially phase-triggered to provide proper operation of the RQL netlist circuit.

Figure 1:
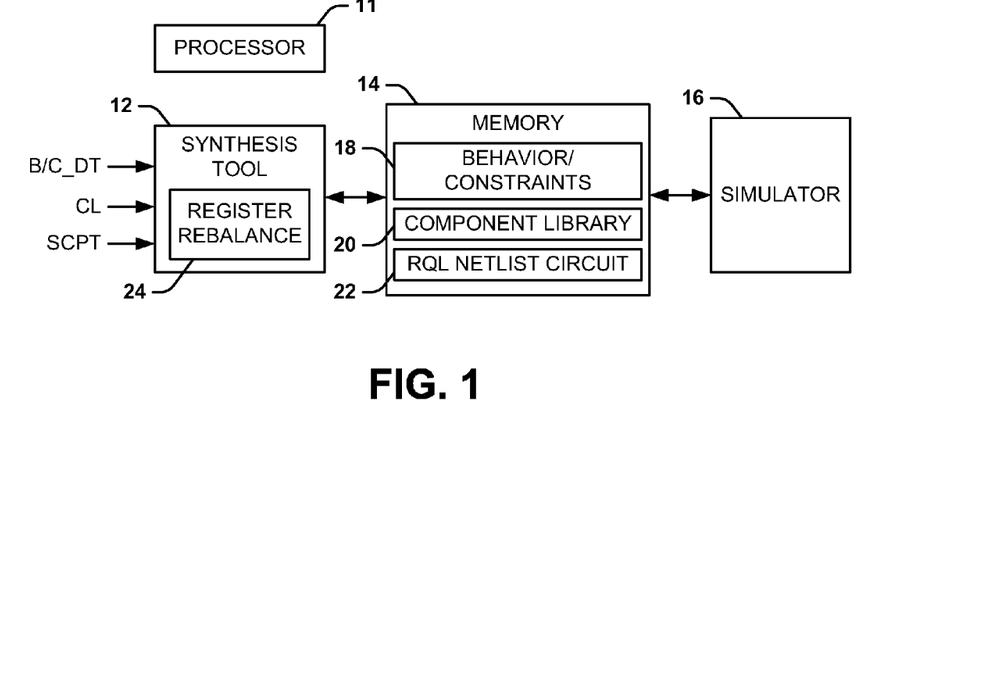
FIG. 1 illustrates an example of a circuit synthesis system.

FIG. 1 illustrates an example of a circuit synthesis system 10. The circuit synthesis system 10 can be implemented for designing circuits, such as complementary metal-oxide semiconductor (CMOS) circuits, Reciprocal Quantum Logic (RQL) circuits, or a combination of both. The circuit synthesis system 10 includes a processor 11, a synthesis tool 12, and a memory 14. In the example of FIG. 1, the circuit synthesis system 10 is also demonstrated as including a simulator 16, though the simulator 16 is provided via example, and is not necessary to circuit synthesis as described herein. The synthesis tool 12 can be configured, for example, as any of a variety of commercial synthesis tools that are typically configured to design CMOS and/or RQL circuits (e.g., via the processor 11). As an example, the synthesis tool 12 can operate based on behavioral Register Transfer Level (RTL) code, VHSIC Hardware Description Language (VHDL) code, or Verilog code. In the example of FIG. 1, the synthesis tool 12 receives an input B/C_DT from a user that can correspond to behavioral and/or constraint data associated with a desired RQL circuit design, such as via any of a variety of interfaces. For example, the input B/C_DT can include predetermined behavioral code and/or operational constraints associated with the desired RQL circuit design. The operational constraint data and the behavioral code of the input B/C_DT associated with the desired RQL circuit design can be saved in the memory 14 as a set of behavior/constraints 18. Additionally, the user can provide an input CL corresponding to a component library corresponding to the available circuit tools from which the desired RQL circuit can be designed (e.g., a ".lib" file, such as provided from the user or from an ASIC manufacturer that may fabricate the resultant desired RQL circuit). In the example of FIG. 1, the component library associated with the input CL can be saved in the memory 14 as a component library 20.

The synthesis tool 12 can be configured to generate an RQL netlist circuit 22 via the behavior/constraints 18 and the component library 20 (e.g., via the processor 11). As an example, the synthesis tool 12 can be stored in and executable from the memory 14, or can be stored in and executable from a separate memory. In the example of FIG. 1, the RQL netlist circuit 22 is stored in the memory 14. The RQL netlist circuit 22 can include superconducting computing devices, as well as CMOS circuit device placeholders, such that the RQL netlist circuit 22 can resemble a CMOS circuit design based on existing CMOS and/or RQL circuit tools from the component library 20, as described herein. For example, the synthesis tool 12 can implement an elaborate function based on the behavior/constraints 18 to provide an initial functional concept circuit for the RQL netlist circuit 22, and can implement a compile or optimize function based on the component library 20 to generate the RQL netlist circuit 22. Accordingly, as described herein, the user can design an RQL circuit based on the RQL netlist circuit 22 (e.g., via other tools to implement a place-and-route operation to build an application specific integrated circuit (ASIC)) that can be optimized via the circuit synthesis system 10, as opposed to manually, to substantially mitigate labor-intensive design and simulation processes.

As an example, some CMOS circuit devices are not able to be replicated in RQL circuit design based on the tools that are typically available in the component library 20 of the synthesis tool 12. One example is a clock-triggered flip-flop (FF) circuit device. Such a limitation of typical synthesis tools, such as the synthesis tool 12, can limit the design of RQL circuits using the synthesis tool 12 based on the combination of sequential and combinatorial behavior of RQL circuits, as opposed to the strictly behavioral or sequential behavior of CMOS circuits. Therefore, it may be difficult or impossible to design and simulate RQL circuits having the equivalent capability of clock-triggered flip-flop circuit devices using the components available in the component library 20 in the synthesis tool 12. However, as described herein, by providing a certain sequence of the input scripts SCPT and the addition of a placeholder FF in the component library 20 which emulates flip-flop device functionality in an RQL circuit design, a user can synthesize and optimize an RQL circuit using a synthesis tool intended to optimize CMOS designs. As described herein, the flip-flop device placeholder describes a flip-flop or other device that is implemented as a placeholder in the circuit system for the purpose of representing registers in RQL and for separating the circuit system into subsystems, as described herein. Thus, the term "placeholder FF" is not intended to be limited to implementing an actual FF device as the placeholder, but can be any type of device in the component library 20 (e.g., as conceptually represented in RTL) that can serve as a placeholder for such purposes. The input scripts SCPT can, for example, be provided subsequent to an initial elaborate and compile function that is provided via the synthesis tool 12. As an example, the input scripts SCPT can include at least one of netlist file edits to edit the RQL netlist circuit 22, changes to the behavior/constraints 18, changes to the component library 20, or commands to the synthesis tool 12 to modify the structure of the RQL netlist circuit 22.

As an example, the synthesis tool 12 can generate the initial functional concept circuit for the RQL netlist circuit 22 based on the behavior/constraints 18 to include a CMOS flip-flop device placeholder that is coupled to a circuit system (e.g., via at least one of an input or an output of the CMOS flip-flop device placeholder), but may not be able to compile the CMOS flip-flop device placeholder into the resultant RQL netlist circuit 22. Therefore, the input scripts SCPT can include replacing the CMOS flip-flop device placeholder coupled to a circuit system in the RQL netlist circuit 22 and separating the circuit system into a plurality of circuit subsystems. For example, the user can provide the input scripts SCPT to replace the flip-flop device placeholder with a plurality of sequential flip-flop devices that are each associated with a given respective phase of a clock signal, and can thus each be associated with a respective one of the plurality of circuit subsystems. Similar to as described previously, the sequential flip-flop devices are not intended to be limited to actual flip-flop devices, but can instead be implemented as any of a variety of other register-type devices. In the example of FIG. 1, the synthesis tool 12 includes a register rebalance function 24 that can be configured to distribute the plurality of sequential flip-flop devices throughout the circuit system (e.g., based on graph-theory) to provide an acceptable timing distribution throughout the circuit system, thus establishing multiple circuit subsystems between the distributed flip-flop devices, each associated with a separate respective phase of the clock signal. As described herein, the term "register rebalance function" is used to describe any of a variety of equivalent timing distribution operations with respect to the registers (e.g., register rebalance, balance registers, optimize registers, retime, etc.). For example, the register rebalance function 24 can associate each of the flip-flop devices that replaced the flip-flop device placeholder with a separate respective one of the circuit subsystems. The user can then remove the flip-flop device (e.g., the replacement flip-flop devices) via the script inputs SCPT to couple the circuit subsystems together, with each of the circuit subsystems operating on a respective separate phase of the clock signal, to provide the resultant RQL netlist circuit 22. Additionally, the user can provide additional Josephson transmission lines (JTLs) via the input scripts SCPT to provide phase timing delays between consecutive circuit subsystems for proper phase sequencing of the RQL netlist circuit 22.

Figure 2:
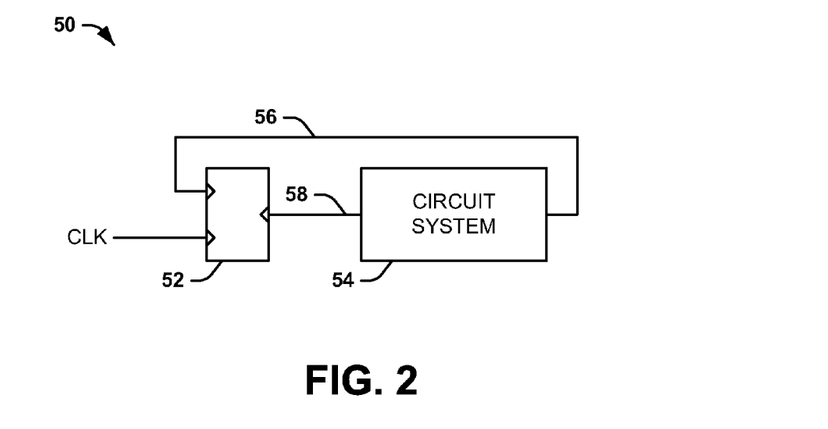
FIG. 2 illustrates an example of an RQL netlist circuit.

FIG. 2 illustrates an example of an RQL netlist circuit 50. The RQL netlist circuit 50 can correspond to an initial stage of designing the RQL netlist circuit 22 in the example of FIG. 1 using the synthesis tool 12. The RQL netlist circuit 50 can thus correspond to an RQL circuit that is desired to be designed and optimized via the circuit synthesis system 10.

The RQL netlist circuit 50 includes a flip-flop device 52 and a circuit system 54. The flip-flop device 52 can correspond to a CMOS clock-triggered flip-flop (e.g., a D flip-flop), such as provided in an initial RQL netlist circuit 50 (e.g., via an elaborate function of the synthesis tool 12) and is coupled to the circuit system 54 (e.g., also added to the RQL netlist circuit 50 via the elaborate function of the synthesis tool 12) at both an input via a feedback loop 56 and an output via an output signal 58. The flip-flop device 52 also includes a clock input that receives a clock signal CLK. The circuit system 54 can correspond to a variety of circuit devices and/or logic devices that can include RQL circuit devices, CMOS circuit devices (e.g., as placeholders), or a combination of RQL and CMOS circuit devices. For example, the circuit system 54 can be representative of a transition from a sequential circuit to a combinatorial circuit with respect to RQL circuit devices to simulate CMOS circuit components. As described previously, an RQL circuit operates based on a combination of sequential and combinatorial signal behavior, as opposed to strictly sequential or strictly combinatorial, as provided by CMOS circuits, and more particularly as CMOS flip-flop devices operate. Therefore, the flip-flop device 52 cannot function properly in the resultant RQL netlist circuit 22. Accordingly, the user can provide a sequence of the input scripts SCPT to provide clock-triggered flip-flop capability in the RQL netlist circuit 22, beginning with adding the flip-flop device 52 initially as a placeholder. It is to be understood that, while the RQL netlist circuit 50 is demonstrated in the example of FIG. 2 as including only a single flip-flop device 52, the techniques described herein are applicable to the inclusion of multiple (e.g., hundreds or thousands) of flip-flop devices.

Figure 3:
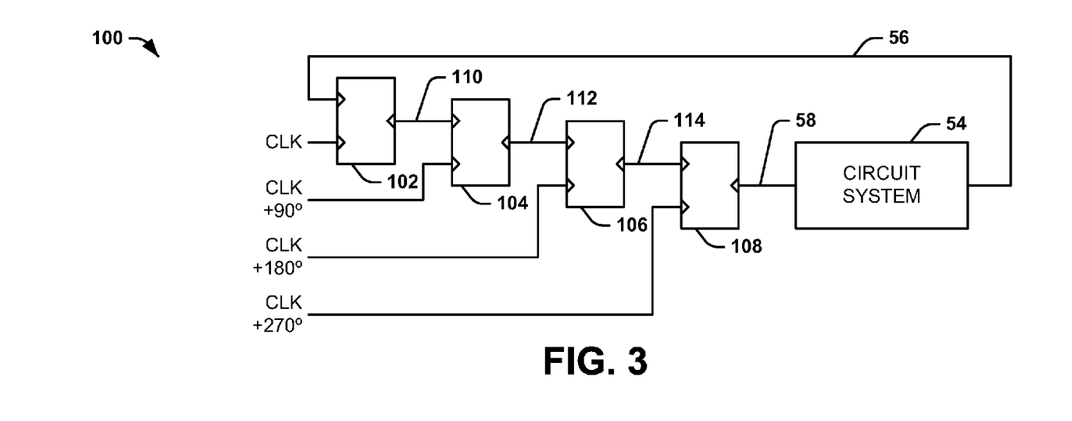
FIG. 3 illustrates another example of an RQL netlist circuit.

FIG. 3 illustrates another example of an RQL netlist circuit 100. The RQL netlist circuit 100 can correspond to a stage of designing the RQL netlist circuit 22 in the example of FIG. 1 using the synthesis tool 12. For example, the RQL netlist circuit 100 can correspond to a stage immediately following the initial stage demonstrated by the RQL netlist circuit 50 in the example of FIG. 2.

In the example of FIG. 3, the user can provide the input scripts SCPT to the synthesis tool 12 to replace the flip-flop device 52 with a plurality of sequential flip-flop devices, demonstrated as a first flip-flop device 102, a second flip-flop device 104, a third flip-flop device 106, and a fourth flip-flop device 108, that are sequentially coupled. The first flip-flop device 102 is coupled to the circuit system 54 via the feedback loop 56, and is coupled to the second flip-flop device 104 via an output signal 110. The second flip-flop device 104 is coupled to the third flip-flop device 106 via an output signal 112, and the third flip-flop device 106 is coupled to the fourth flip-flop device 108 via an output signal 114, while the fourth flip-flop device is coupled to the circuit system 54 via the output signal 58.

In the example of FIG. 3, each of the flip-flop devices 102, 104, 106, and 108 includes a clock input that receives a respective clock signal CLK, but which are respectively out-of-phase by 90°. Thus, the first flip-flop device 102 receives the clock signal CLK, the second flip-flop device 104 receives a clock signal CLK+90°, the third flip-flop device 106 receives a clock signal CLK+180°, and the fourth flip-flop device 108 receives a clock signal CLK+270°. For example, the input scripts SCPT can first replace the flip-flop device 52 with the respective flip-flop devices 102, 104, 106, and 108 that are each provided a common clock signal CLK, and can then change the phase of the clock signal CLK to the respective 90° out-of-phase clock signals with respect to consecutive flip-flop devices 102, 104, 106, and 108 (e.g., based on a "coloring" procedure). Therefore, in replacing the placeholder flip-flop device 52 with the flip-flop devices 102, 104, 106, and 108, the user can associate separate respective phases of the clock signal CLK with each respective one of the flip-flop devices 102, 104, 106, and 108. While it is described herein that the flip-flop devices 102, 104, 106, and 108 are described as flip-flops, it is to be understood that the flip-flop devices 102, 104, 106, and 108 can correspond to latches (e.g., D latches).

Figure 4:
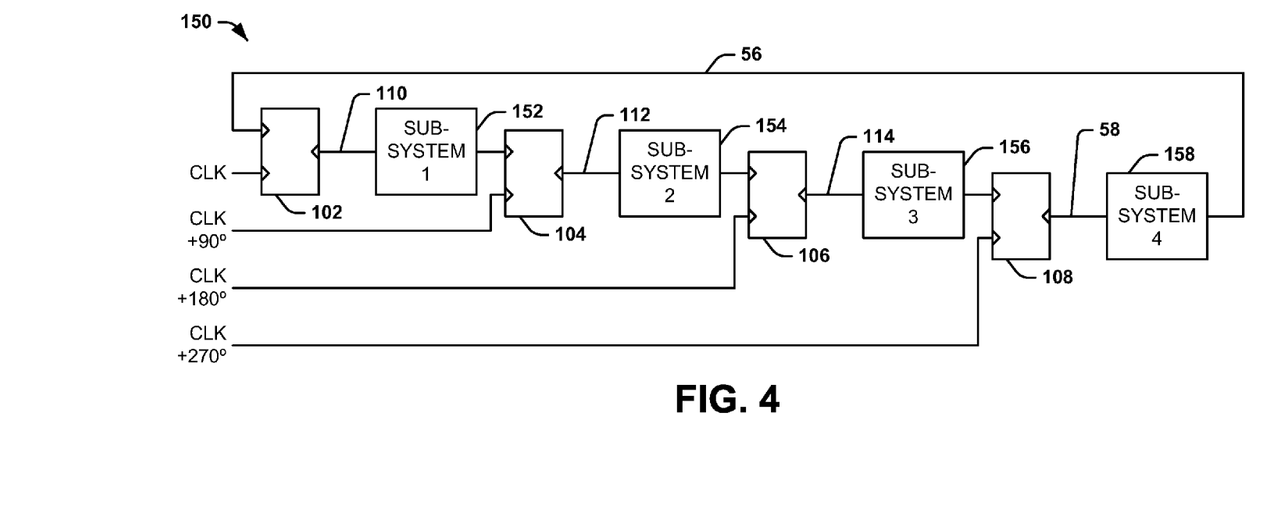
FIG. 4 illustrates another example of an RQL netlist circuit.

FIG. 4 illustrates yet another example of an RQL netlist circuit 150. The RQL netlist circuit 150 can correspond to a stage of designing the RQL netlist circuit 22 in the example of FIG. 1 using the synthesis tool 12. For example, the RQL netlist circuit 150 can correspond to a stage immediately following the stage demonstrated by the RQL netlist circuit 100 in the example of FIG. 3.

In the example of FIG. 4, the user can implement the register rebalance function 24 to separate the circuit system 54 into a plurality of circuit subsystems, demonstrated as a first circuit subsystem 152, a second circuit subsystem 154, a third circuit subsystem 156, and a fourth circuit subsystem 158, that can collectively correspond to the circuit system 54. The first circuit subsystem 152 interconnects the first flip-flop device 102 and the second flip-flop device 104 and the second circuit subsystem 154 interconnects the second flip-flop device 104 and the third flip-flop device 106. Similarly, the third circuit subsystem 156 interconnects the third flip-flop device 106 and the fourth flip-flop device 108 and the fourth circuit subsystem 158 interconnects the fourth flip-flop device 108 and the first flip-flop device 102 via the feedback loop 56.

As described in greater detail herein, the circuit subsystems 152, 154, 156, and 158 can be distributed based on the register rebalance function 24 (e.g., based on graph-theory). As an example, the register rebalance function 24 can divide the circuit system 54 into approximately equal sequential portions in generating the circuit subsystems 152, 154, 156, and 158. Therefore, the register rebalance function 24 can distribute the circuit subsystems 152, 154, 156, and 158 between the flip-flop devices 102, 104, 106, and 108, such that each of the circuit subsystems 152, 154, 156, and 158 are associated with a respective one of the phases of the clock signal CLK. As a result, the flip-flop devices 102, 104, 106, and 108 can correspond to phase boundaries corresponding to quarter cycles of the clock signal CLK.

In the example of FIG. 4, the flip-flop devices 102, 104, 106, and 108 are demonstrated as each being separated by a respective one of the circuit subsystems 152, 154, 156, and 158. However, it is to be understood that, in response to the register rebalance function 24, the RQL netlist circuit 150 could include additional flip-flop devices and/or circuit subsystems that are associated with the separate phases of the clock signal CLK (e.g., CLK, CLK+90°, CLK+180°, and CLK+270°). In addition, the register rebalance function 24 can create multiple circuit subsystems that are each associated with a given one of the separate phases of the clock signal CLK, and which can merge or split with respect to a preceding or proceeding flip-flop device.

Figure 5:
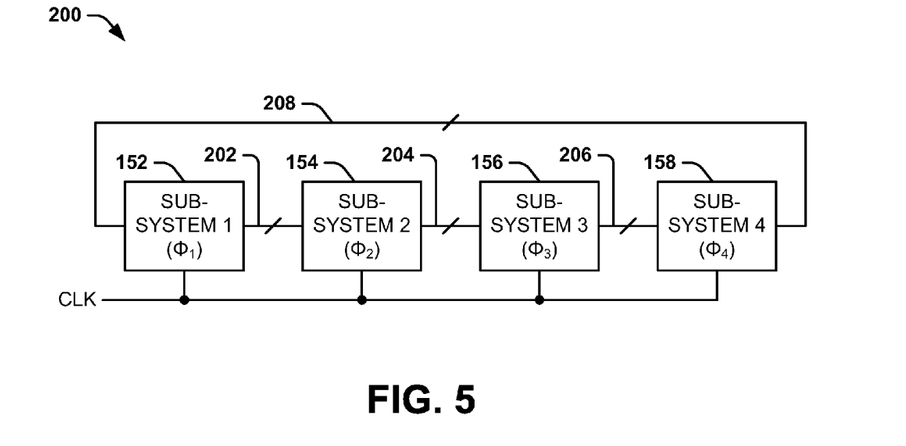
FIG. 5 illustrates another example of an RQL netlist circuit.

FIG. 5 illustrates an example of an RQL netlist circuit 200. The RQL netlist circuit 200 can correspond to a stage of designing the RQL netlist circuit 22 in the example of FIG. 1 using the synthesis tool 12. For example, the RQL netlist circuit 200 can correspond to a stage immediately following the stage demonstrated by the RQL netlist circuit 200 in the example of FIG. 4.

In the example of FIG. 5, the user can provide the input scripts SCPT to the synthesis tool 12 to remove the flip-flop devices 102, 104, 106, and 108. As a result, respective pairs of the circuit subsystems 152, 154, 156, and 158 are conductively coupled to each other. The conductive coupling of the circuit subsystems 152, 154, 156, and 158 in the RQL netlist circuit 200 can be based on JTLs, such as configured to propagate single flux quantum (SFQ) pulses sequentially from one of the circuit subsystems 152, 154, 156, and 158 to a next consecutive one of the circuit subsystems 152, 154, 156, and 158. In the example of FIG. 5, the first circuit subsystem 152 is coupled to the second circuit subsystem 154 via a first JTL 202, the second circuit subsystem 154 is coupled to the third circuit subsystem 156 via a second JTL 204, the third circuit subsystem 156 is coupled to the fourth circuit subsystem 158 via a third JTL 206, and the fourth circuit subsystem 158 is coupled to the first circuit subsystem 152 via a fourth JTL 208 corresponding to the feedback loop 56.

In addition, the clock signal CLK is provided to each of the circuit subsystems 152, 154, 156, and 158. In the example of FIG. 5, the first circuit subsystem 152 is demonstrated as having a first phase $\phi_1$, the second circuit subsystem 154 is demonstrated as having a second phase $\phi_2$, the third circuit subsystem 156 is demonstrated as having a third phase $\phi_3$, and the fourth circuit subsystem 158 is demonstrated as having a fourth phase $\phi_4$. Each of the phases $\phi_1$, $\phi_2$, $\phi_3$, and $\phi_4$ can be consecutively out-of-phase by approximately 90°. For example, the association of the separate phases $\phi_1$, $\phi_2$, $\phi_3$, and $\phi_4$ of the clock signal CLK can be based on a trace algorithm along each of the JTLs 202, 204, 206, and 208 with respect to the removed flip-flop devices 102, 104, 106, and 108 via the input scripts SCPT to determine the respective one of the phases $\phi_1$, $\phi_2$, $\phi_3$, and $\phi_4$ for the circuit subsystems 152, 154, 156, and 158.

As an example, in the RQL netlist circuit 200, the clock signal CLK can be configured as a quadrature clock signal comprising the four respective phases of the clock signal CLK in the examples of FIGS. 3 and 4 (e.g., CLK, CLK+90°, CLK+180°, and CLK+270°). For example, the quadrature clock signal CLK can include two AC signals that are approximately 90° out-of-phase with respect to each other and that are each inductively coupled to every other one of the circuit subsystems 152, 154, 156, and 158 via a respective forward polarity connection and reverse polarity connection. Therefore, the clock signal CLK is configured to provide sequential timing pulses to each of the circuit subsystems 152, 154, 156, and 158 at each quarter-cycle of the clock signal CLK. Accordingly, the RQL netlist circuit 200 can be designed and synthesized to include clock-triggered flip-flop device capability with respect to the circuit system 54 corresponding to the desired RQL circuit design.

Figure 6:
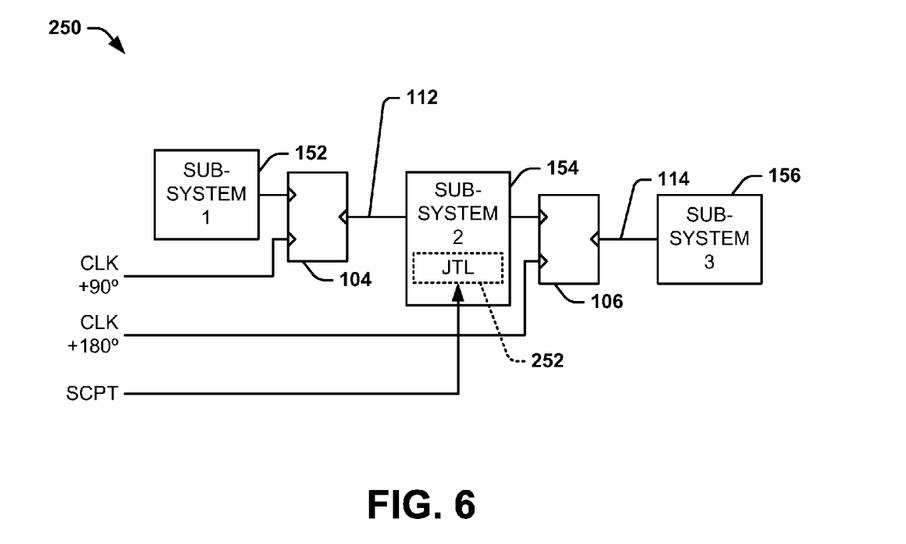
FIG. 6 illustrates another example of an RQL netlist circuit.

FIG. 6 illustrates another example of an RQL netlist circuit 250. The RQL netlist circuit 250 can correspond approximately to the RQL netlist circuit 150 in the example of FIG. 4, such as to correct consecutive phase segment timing problems associated with the RQL netlist circuit 150. In the example of FIG. 6, the RQL netlist circuit 250 only demonstrates the circuit subsystems 152, 154, and 156, and only the flip-flop devices 104 and 106. However, it is to be understood that the RQL netlist circuit 250 is demonstrated as only a portion of the RQL netlist circuit 150, and that the remaining portions (i.e., the circuit subsystem 150 and the flip-flop devices 102 and 108) have been omitted for brevity and clarity.

As described previously, the circuit subsystems 152, 154, 156, and 158 can be distributed based on the register rebalance function 24 (e.g., based on graph-theory). However, the division of the circuit system 54 can be unequal, such as resulting in one or more of the circuit subsystems 152, 154, 156, and 158 being substantially empty (e.g., absent circuit components), such that two of the circuit subsystems 152, 154, 156, and 158 having non-consecutive phases $\phi_1$, $\phi_2$, $\phi_3$, and $\phi_4$ of the clock signal can be conductively coupled subsequent to removal of the flip-flop devices 102, 104, 106, and 108. Therefore, the coupling between a pair of the circuit subsystems 152, 154, 156, and 158 may not be consecutive, such that phase triggering of the circuit subsystems 152, 154, 156, and 158 may not occur in the proper sequence of the phases $\phi_1$, $\phi_2$, $\phi_3$, and $\phi_4$ based on the potential non-consecutive coupling of the circuit subsystems 152, 154, 156, and 158. In other words, circuit devices associated with a given one of the circuit subsystems 152, 154, 156, and 158, and thus associated with a respective one of the phases $\phi_1$, $\phi_2$, $\phi_3$, and $\phi_4$ cannot be directly coupled to a non-consecutive other one of the circuit subsystems 152, 154, 156, and 158, and thus a non-consecutive respective one of the phases $\phi_1$, $\phi_2$, $\phi_3$, and $\phi_4$. Therefore, the user can add one or more additional JTLs to a given empty one or more circuit subsystems 152, 154, 156, and 158 to provide sufficient additional phase delay to provide the association between the conductively-coupled circuit devices in separate non-consecutive circuit subsystems 152, 154, 156, and 158 with the proper respective phases $\phi_1$, $\phi_2$, $\phi_3$, and $\phi_4$ at which they are to be triggered by the clock signal CLK.

In the example of FIG. 6, prior to removal of the flip-flop devices 102, 104, 106, and 108, the circuit subsystem 154 can be discovered to be substantially empty, such as not including any or very few circuit components, and thus providing having its input 112 and its output 114 (as demonstrated output from the flip-flop device 106) as conductively coupled. For example, the user can determine that the circuit subsystem 154 is substantially empty subsequent to implementing the register rebalance function 24. Therefore, removal of the flip-flop devices 102, 104, 106, and 108, and particularly the flip-flop devices 104 and 106, would result in conductive coupling of the circuit subsystems 152 and 156. However, because the circuit subsystems 152 and 156 have non-consecutive phases $\phi_1$ and $\phi_3$, the timing of triggering of the circuit subsystems 152 and 156 in response to the phases $\phi_1$ and $\phi_3$ of the clock would result in incorrect operation of the circuit system 54 with respect to timing.

In response to a determination of a timing problem resulting from a substantially empty circuit subsystem (e.g., the circuit subsystem 154 in the example of FIG. 6), the user can add an additional JTL 252 to the circuit subsystem 154 via the input scripts SCPT, such as to interconnect the flip-flop devices 104 and 106. Therefore, the additional JTL 252 can provide additional phase delay to provide the association between the non-consecutive circuit subsystems 152 and 156 with the proper respective phases $\phi_1$ and $\phi_3$ at which they are to be triggered by the clock signal CLK. In the example of FIG. 6, a conductive coupling between the first circuit subsystem 152 having the phase $\phi_1$ and the third circuit subsystem 156 having the phase $\phi_3$ is a non-consecutive conductive-coupling based on having a phase-segment difference greater than one (e.g., having a phase-segment difference of two, in this example). Therefore, the user can add the single additional JTL 252 in that conductive coupling between the first and third circuit subsystems 152 and 156 to provide an additional one phase-segment delay in the conductive coupling between the first and third subsystems 152 and 156. Accordingly, upon removal of the flip-flop devices 102, 104, 106, and 108, particularly the flip-flop devices 104 and 106, the JTL 252 can provide the sufficient one phase-segment delay between the phases $\phi_1$ and $\phi_3$ (e.g., as triggered by the phase $\phi_2$ of the clock signal CLK) to provide proper triggering of the circuit subsystems 152 and 156 on the respective phases $\phi_1$ and $\phi_3$ of the clock signal CLK.

While the example of FIG. 6 demonstrates that it is the circuit subsystem 154 that is the substantially empty circuit subsystem to which the JTL 252 is added, it is to be understood that the methodology described herein could apply to any of the other circuit subsystems 152, 156, or 158, and could likewise be applicable to more than one of the circuit subsystems. As an example, the user can add one additional JTL 252 to any of the circuit subsystems 152, 154, 156, and 158 that are substantially empty circuit subsystems to ensure that the additional JTL 252 provides sufficient phase delay for corresponding triggering of the circuit subsystems 152, 154, 156, and 158 at the respective phases $\phi_1$, $\phi_2$, $\phi_3$, and $\phi_4$. For example, the user can trace forward and backward along the conductive coupling between the circuit subsystems 152, 154, 156, and 158 to determine phase-segment differences based on the respective phases $\phi_1$, $\phi_2$, $\phi_3$, and $\phi_4$ associated with the circuit subsystems 152, 154, 156, and 158. Accordingly, by adding one or more JTLs 252 between each conductively-coupled circuit subsystems 152, 154, 156, and 158 having non-consecutive phases $\phi_1$, $\phi_2$, $\phi_3$, and $\phi_4$, the circuit subsystems 152, 154, 156, and 158 can be properly sequentially triggered by the clock signal CLK to provide accurate simulation by the simulator 16, and thus proper operation of the resulting RQL circuit design.

The examples of FIGS. 2-6 thus provide a sequence of input scripts SCPT that can be provided by a user to the synthesis tool 12 to synthesize an RQL circuit that can include clock-triggered flip-flop device capability. While the methodology stages are demonstrated sequentially by the examples of FIGS. 2-6, it is to be understood that the input scripts SCPT and stages of design of the RQL circuit are not limited to the order of the stages demonstrated by the examples of FIGS. 2-6. For example, the placeholder flip-flop device 52 can be replaced by the plurality of flip-flop devices 102, 104, 106, and 108 subsequent to the separation of the circuit system 54 (e.g., via the register rebalance function 24), instead of prior. Similarly, the additional JTLs 252 can be added to the conductive couplings between the circuit subsystems 152, 154, 156, and 158 before removal of the flip-flop devices 102, 104, 106, and 108. Accordingly, the methods for designing and synthesizing the RQL circuit can be implemented in a variety of ways.

Figure 7:
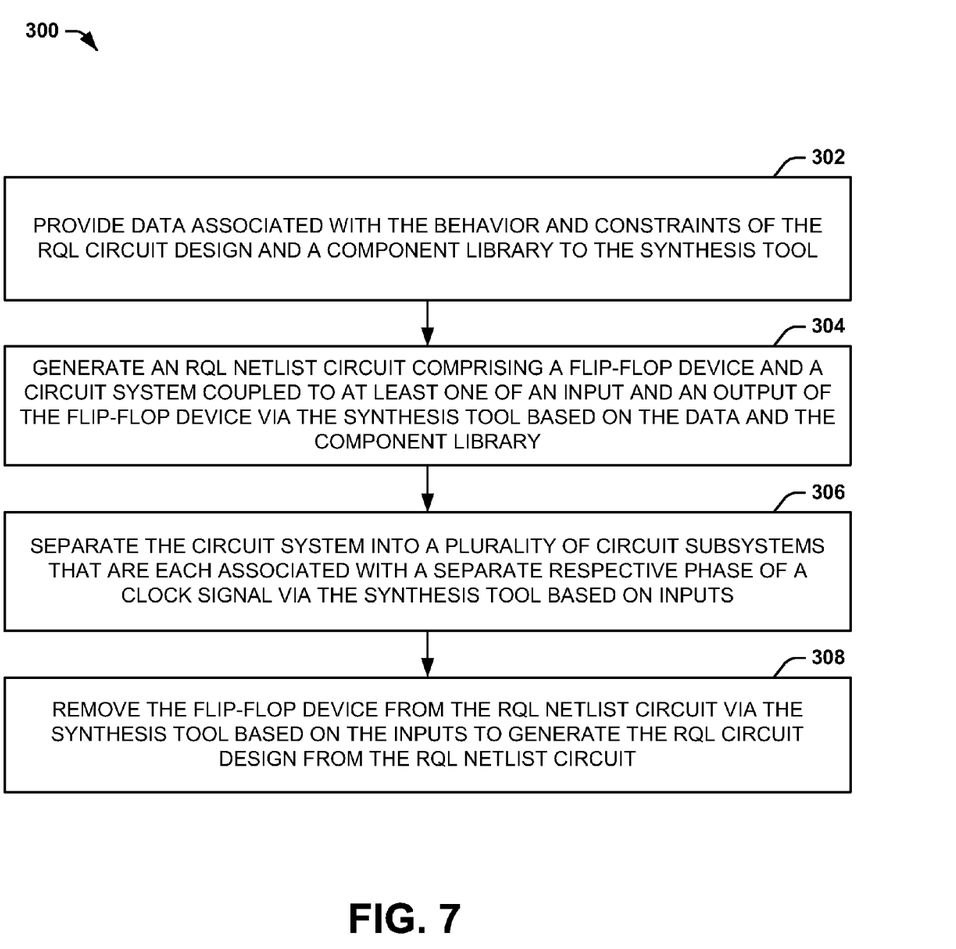
FIG. 7 illustrates an example of a method for generating an RQL circuit design via a synthesis tool.
Figure 8:
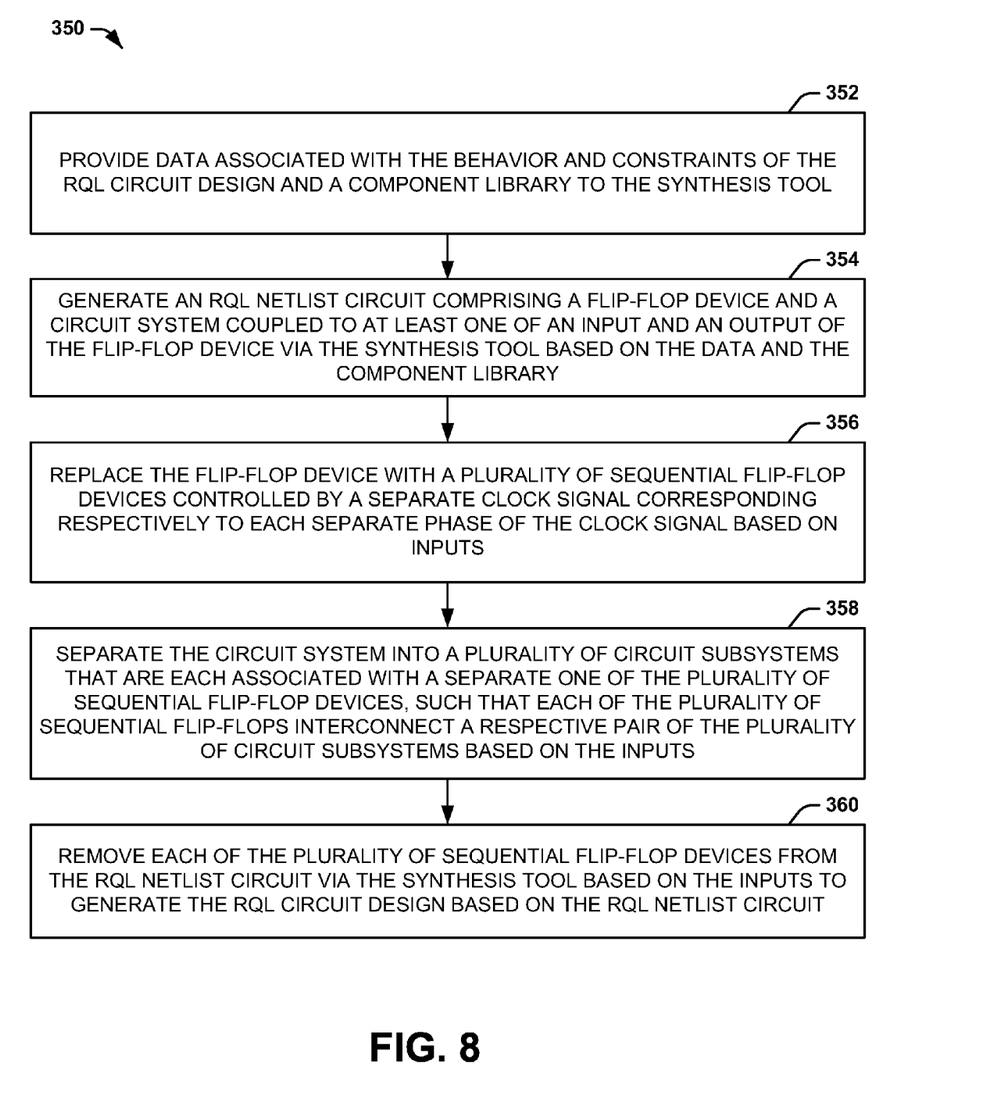
FIG. 8 illustrates another example of a method for generating an RQL circuit design via a synthesis tool.
Figure 9:
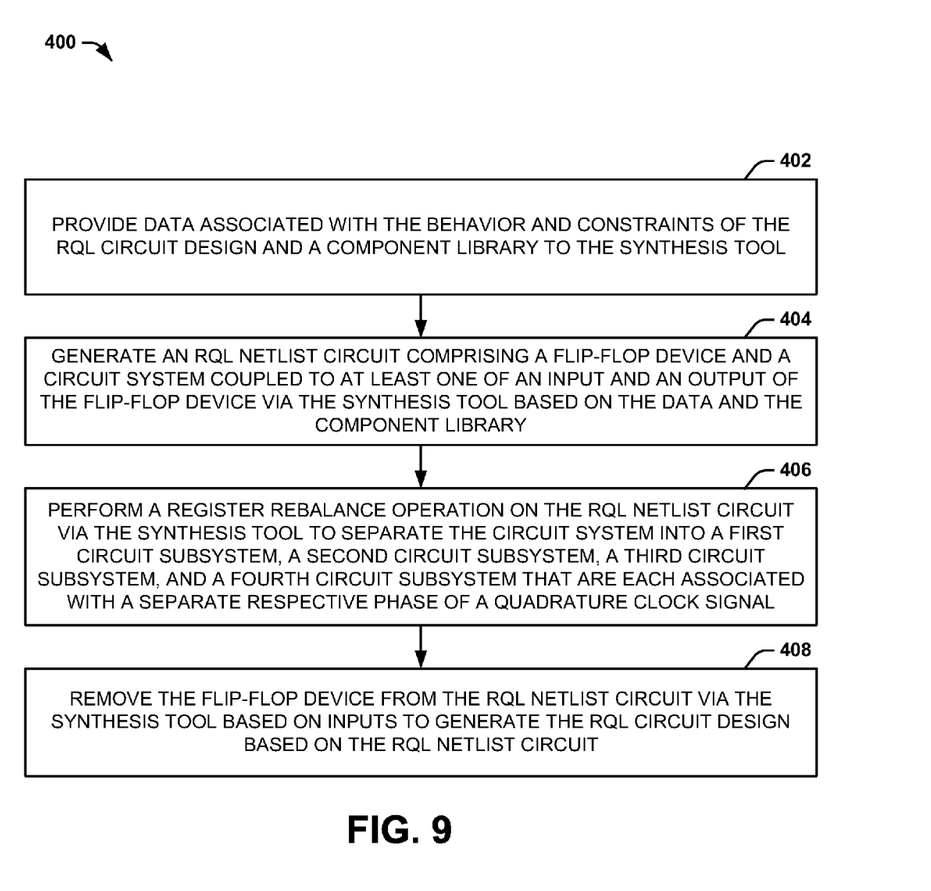
FIG. 9 illustrates yet another example of a method for generating an RQL circuit design via a synthesis tool.

In view of the foregoing structural and functional features described above, a methodology in accordance with various aspects of the present invention will be better appreciated with reference to FIGS. 7-9. While, for purposes of simplicity of explanation, the methodology of FIGS. 7-9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 illustrates an example of a method 300 for generating an RQL circuit design (e.g., the RQL circuit 250) via a synthesis tool (e.g., the synthesis tool 12). At 302, data associated with behavior and constraints of the RQL circuit design (e.g., the behavior/constraints 18) and a component library (e.g., the component library 20) are provided to the synthesis tool. At 304, an RQL netlist circuit (e.g., the RQL netlist circuit 22) comprising a flip-flop device (e.g., the flip-flop device 52) and a circuit system (e.g., the circuit system 54) coupled to at least one of an input and an output of the flip-flop device (e.g., via the feedback loop 56 and the output 58) via the synthesis tool based on the data and the component library. At 306, the circuit system is separated into a plurality of circuit subsystems (e.g., the circuit subsystems 152, 154, 156, and 158) that are each associated with a separate respective phase of a clock signal (e.g., the clock signal CLK) via the synthesis tool based on inputs (e.g., the script input SCPT). At 308, the flip-flop device is removed from the RQL netlist circuit via the synthesis tool based on the inputs to generate a resultant RQL netlist circuit (e.g., the RQL netlist circuit 22) corresponding to the RQL circuit design.

FIG. 8 illustrates another example of a method 350 for generating an RQL circuit design (e.g., the RQL circuit 250) via a synthesis tool (e.g., the synthesis tool 12). At 352, data associated with behavior and constraints of the RQL circuit design (e.g., the behavior/constraints 18) and a component library (e.g., the component library 20) are provided to the synthesis tool. At 354, an RQL netlist circuit (e.g., the RQL netlist circuit 22) comprising a flip-flop device (e.g., the flip-flop device 52) and a circuit system (e.g., the circuit system 54) coupled to at least one of an input and an output of the flip-flop device (e.g., via the feedback loop 56 and the output 58) via the synthesis tool based on the data and the component library. At 356, the flip-flop device is replaced with a plurality of sequential flip-flop devices (e.g., the flip-flop devices 102, 104, 106, and 108) controlled by a separate clock signal (e.g., the clock signals CLK, CLK+90°, CLK+180°, and CLK+270°), corresponding respectively to each separate phase of the clock signal (e.g., the phases $\phi_1$, $\phi_2$, $\phi_3$, and $\phi_4$) based on inputs (e.g., the input script SCPT). At 358, the circuit system is separated into a plurality of circuit subsystems (e.g., the circuit subsystems 152, 154, 156, and 158) that are each associated with a separate one of the plurality of sequential flip-flop devices, such that each of the plurality of sequential flip-flops interconnect a respective pair of the plurality of circuit subsystems based on the inputs. At 360, each of the plurality of sequential flip-flop devices is removed from the RQL netlist circuit via the synthesis tool based on the inputs to generate a resultant RQL netlist circuit (e.g., the RQL netlist circuit 22) corresponding to the RQL circuit design.

FIG. 9 illustrates yet another example of a method 400 for generating an RQL circuit design (e.g., the RQL circuit 250) via a synthesis tool (e.g., the synthesis tool 12). At 402, data associated with behavior and constraints of the RQL circuit design (e.g., the behavior/constraints 18) and a component library (e.g., the component library 20) are provided to the synthesis tool. At 404, an RQL netlist circuit (e.g., the RQL netlist circuit 22) comprising a flip-flop device (e.g., the flip-flop device 52) and a circuit system (e.g., the circuit system 54) coupled to at least one of an input and an output of the flip-flop device (e.g., via the feedback loop 56 and the output 58) via the synthesis tool based on the data and the component library. As an example, the flip-flop device can be replaced by a plurality of flip-flop devices that each correspond to a separate phase of a clock signal, such as can eventually correspond, respectively, to register rebalanced circuit subsystems. At 406, a register rebalance operation (e.g., via the register rebalance function 24) is performed on the RQL netlist circuit via the synthesis tool to separate the circuit system into a first circuit subsystem (e.g., the first circuit subsystem 152), a second circuit subsystem (e.g., the second circuit subsystem 154), a third circuit subsystem (e.g., the third circuit subsystem 156), and a fourth circuit subsystem (e.g., the fourth circuit subsystem 158) that are each associated with a separate respective phase of a quadrature clock signal (e.g., the phases $\phi_1$, $\phi_2$, $\phi_3$, and $\phi_4$ of the clock signal CLK). As an example, the register rebalance operation can be performed on an RQL netlist circuit that includes a plurality of flip-flop devices, such that the flip-flop device can be one of several flip-flop devices or can correspond to a plurality of flip-flop devices. At 408, the flip-flop device (e.g., one or more of the flip-flop devices) is removed from the RQL netlist circuit via the synthesis tool based on inputs (e.g., the input script SCPT) to generate a resultant RQL netlist circuit (e.g., the RQL netlist circuit 22) corresponding to the RQL circuit design.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A non-transitory computer readable medium configured to store instructions that, when executed, are configured to perform a method for generating a Reciprocal Quantum Logic (RQL) circuit design via a synthesis tool, the method comprising:
providing data associated with behavior and constraints of the RQL circuit design and a component library to the synthesis tool;
generating an RQL netlist circuit comprising a flip-flop device placeholder and a circuit system coupled to at least one of an input and an output of the flip-flop device placeholder via the synthesis tool based on the data and the component library;
separating the circuit system into a plurality of circuit subsystems that are each associated with a separate respective phase of a clock signal via the synthesis tool based on inputs;
removing the flip-flop device placeholder from the RQL netlist circuit via the synthesis tool based on the inputs to generate the RQL circuit design from the RQL netlist circuit; and
controlling fabrication of a semiconductor circuit based on the generated RQL circuit design.

2. The medium of claim 1, further comprising replacing the flip-flop device placeholder in the RQL netlist circuit with a plurality of sequential flip-flop devices controlled by a separate clock signal corresponding respectively to each separate phase of the clock signal.

3. The medium of claim 2, wherein separating the circuit system comprises performing a register rebalance operation on the RQL netlist circuit via the synthesis tool to separate the circuit system into the plurality of circuit subsystems that are each associated with a separate one of the plurality of sequential flip-flop devices, such that each of the plurality of sequential flip-flops interconnect a respective pair of the plurality of circuit subsystems.

4. The medium of claim 3, wherein removing the flip-flop device placeholder comprises:
removing each of the plurality of sequential flip-flops to provide a coupling of each respective pair of the plurality of circuit subsystems with respect to each other; and
associating each separate phase of the clock signal to a respective one of the plurality of circuit subsystems to provide sequential triggering of the plurality of circuit subsystems at each separate respective phase of the clock signal via the inputs.

5. The medium of claim 3, further comprising:
evaluating clock phases associated with each of the plurality of circuit subsystems; and
adding at least one Josephson transmission line (JTL) via the inputs to a substantially empty one of the plurality of circuit subsystems that would result in conductive coupling of a pair of the plurality of circuit subsystems having non-consecutive clock phases in response to removal of the plurality of sequential flip-flops.

6. The medium of claim 1, wherein separating the circuit system comprises performing a register rebalance operation on the RQL netlist circuit via the synthesis tool to separate the circuit system into the plurality of circuit subsystems that are each associated with the separate respective phase of the clock signal.

7. The medium of claim 6, wherein providing the inputs comprises replacing the flip-flop device placeholder with a plurality of sequential flip-flop devices that are each associated with a respective one of the plurality of circuit subsystems and are each controlled by a separate clock signal corresponding respectively to each separate respective phase of the clock signal.

8. The medium of claim 1, further comprising:
evaluating clock phases associated with each of the plurality of circuit subsystems; and
adding at least one Josephson transmission line (JTL) via the inputs to a substantially empty one of the plurality of circuit subsystems that would result in conductive coupling of a pair of the plurality of circuit subsystems having non-consecutive clock phases.

9. The medium of claim 8, wherein evaluating the clock phases comprises evaluating each conductive coupling between each of the plurality of circuit subsystems, and wherein adding the at least one JTL comprises adding one JTL for each phase-segment difference of the phase of the clock signal greater than one between the given conductively-coupled pair of the plurality of circuit subsystems.

10. The medium of claim 1, wherein the clock signal is a quadrature clock signal comprising four phases, such that the plurality of circuit subsystems comprises a first circuit subsystem, a second circuit subsystem, a third circuit subsystem, and a fourth circuit subsystem.

11. The medium of claim 1, wherein the synthesis tool is a complementary metal-oxide semiconductor (CMOS) circuit synthesis tool.

12. A non-transitory computer readable medium configured to store instructions that, when executed, are configured to perform a method for generating a Reciprocal Quantum Logic (RQL) circuit design via a CMOS synthesis tool, the method comprising:
providing data associated with behavior and constraints of the RQL circuit design and a component library to the synthesis tool;
generating an RQL netlist circuit comprising a flip-flop device placeholder and a circuit system coupled to at least one of an input and an output of the flip-flop device placeholder via the synthesis tool based on the data and the component library;
replacing the flip-flop device placeholder with a plurality of sequential flip-flop devices controlled by a separate clock signal corresponding respectively to each separate phase of the clock signal based on inputs;
separating the circuit system into a plurality of circuit subsystems that are each associated with a separate one of the plurality of sequential flip-flop devices, such that each of the plurality of sequential flip-flops interconnect a respective pair of the plurality of circuit subsystems based on the inputs;
removing each of the plurality of sequential flip-flop devices from the RQL netlist circuit via the synthesis tool based on the inputs to generate the RQL circuit design based on the RQL netlist circuit; and
controlling fabrication of a semiconductor circuit based on the generated RQL circuit design.

13. The medium of claim 12, wherein separating the circuit system comprises performing a register rebalance operation on the RQL netlist circuit via the synthesis tool to separate the circuit system into the plurality of circuit subsystems that are each associated with the separate one of the plurality of sequential flip-flop devices.

14. The medium of claim 12, wherein removing each of the plurality of sequential flip-flops comprises:
providing a coupling of each respective pair of the plurality of circuit subsystems with respect to each other; and
associating each separate phase of the clock signal to a respective one of the plurality of circuit subsystems to provide sequential triggering of the plurality of circuit subsystems at each separate respective phase of the clock signal via the inputs.

15. The medium of claim 12, further comprising:
evaluating clock phases associated with each of the plurality of circuit subsystems prior to removing each of the plurality of sequential flip-flop devices; and
adding at least one Josephson transmission line (JTL) via the inputs to a substantially empty one of the plurality of circuit subsystems that would result in conductive coupling of a pair of the plurality of circuit subsystems having non-consecutive clock phases in response to removal of the plurality of sequential flip-flops.

16. The medium of claim 12, wherein the clock signal is a quadrature clock signal comprising four phases, such that the plurality of circuit subsystems comprises a first circuit subsystem, a second circuit subsystem, a third circuit subsystem, and a fourth circuit subsystem.

17. A non-transitory computer readable medium configured to store instructions that, when executed, are configured to perform a method for generating a Reciprocal Quantum Logic (RQL) circuit design via a synthesis tool, the method comprising:
providing data associated with behavior and constraints of the RQL circuit design and a component library to the synthesis tool;
generating an RQL netlist circuit comprising a flip-flop device placeholder and a circuit system coupled to at least one of an input and an output of the flip-flop device placeholder via the synthesis tool based on the data and the component library;
performing a register rebalance operation on the RQL netlist circuit via the synthesis tool to separate the circuit system into a first circuit subsystem, a second circuit subsystem, a third circuit subsystem, and a fourth circuit subsystem that are each associated with a separate respective phase of a quadrature clock signal;
removing the flip-flop device placeholder from the RQL netlist circuit via the synthesis tool based on inputs to generate the RQL circuit design based on the RQL netlist circuit; and
controlling fabrication of a semiconductor circuit based on the generated RQL circuit design.

18. The medium of claim 17, wherein providing the inputs comprises replacing the flip-flop device placeholder with a first flip-flop device, a second flip-flop device, a third flip-flop device, and a fourth flip-flop device that are respectively coupled to the first, second, third, and fourth circuit subsystems and are respectively controlled by separate clock signals corresponding to each separate phase of the quadrature clock signal via the inputs.

19. The medium of claim 18, wherein removing the flip-flop device placeholder comprises:
removing each of the first, second, third, and fourth flip-flop device to provide a coupling of consecutive pairs of the first, second, third and fourth circuit subsystems with respect to each other; and
associating the quadrature clock signal to each of the plurality of circuit subsystems via the inputs to provide sequential triggering of the first, second, third, and fourth circuit subsystems at each separate respective phase of the quadrature clock signal.

20. The medium of claim 18, further comprising:
evaluating clock phases associated with each of the first, second, third and fourth circuit subsystems; and
adding at least one Josephson transmission line (JTL) via the inputs to a substantially empty one of the first, second, third and fourth circuit subsystems that would result in conductive coupling of a pair of the first, second, third and fourth circuit subsystems having non-consecutive clock phases in response to removal of the plurality of sequential flip-flops.

* * * * *